Patented Mar. 21, 1939

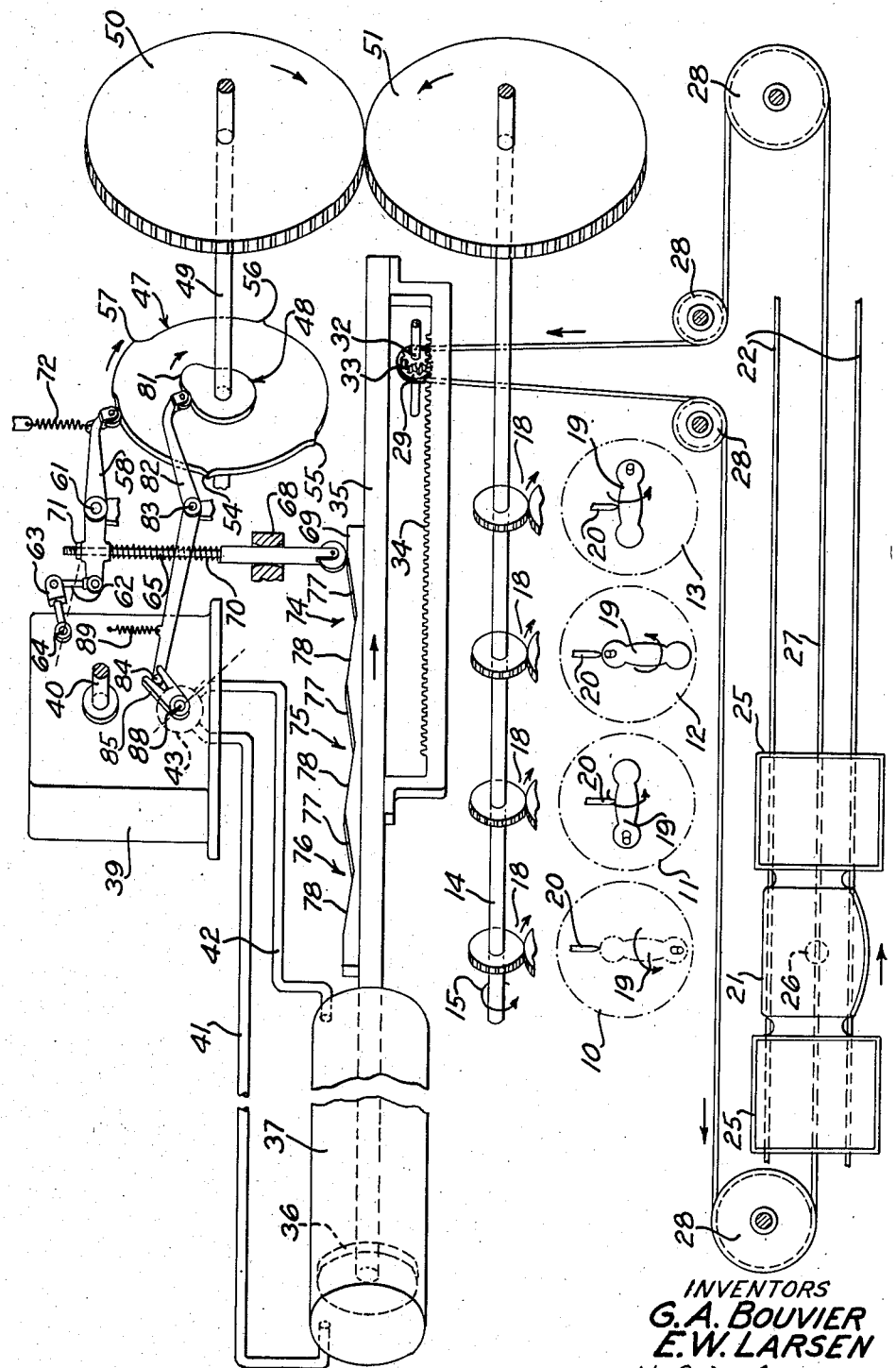

2,151,077

UNITED STATES PATENT OFFICE 2,151,077

CONVEYER SYSTEM

George A. Bouvier, Chicago, and Einer W. Larsen, Elmhurst, Ill., assignors to Western Electric Company, Incorporated, New York, N. Y., a corporation of New York Application March 28, 1936, Serial No. 71,412

13 Claims. (Cl. 198—19)

This invention relates to conveyer systems, and more particularly to a conveyer system for an attendant servicing a plurality of work stations.

An object of the invention is to provide a conveyer system for an attendant servicing a plurality of work stations whereby the several work stations may be operated at maximum efficiency and with a minimum of fatigue to the attendant while servicing the same.

In accordance with one embodiment of the invention as applied, for example, to a multiple unit engraving machine for cutting a continuous groove around the periphery of plastic molded articles at the molding die parting line to remove the overflow material or flash occurring thereat, there is provided an automatic conveyer or chair mechanism for carrying an attendant along from one machine unit or work station to the next so that each work station can be unloaded and/or loaded at the ending and/or beginning of its operating cycle, the cycles of the work stations being in different phases at a given instant. Specifically the chair rides on rails and receives motion from a hydraulic drive with automatic speed and direction control whereby the chair is moved progressively at desired speeds from the first station to the last station in one direction with a predetermined interval between movements and in timed relation with the work being done at the respective stations and then is moved quickly in a reverse direction to the first station to start the cycle again.

Other features and advantages of this invention will more fully appear from the following detailed description, taken in connection with the accompanying drawing, the single figure of which represents a schematic view of a conveyer system embodying the invention shown applied, for example, to a multiple unit engraving machine.

One unit of a multiple unit engraving machine to which the conveyer system of this invention is shown applied is of the type disclosed in the application of G. A. Bouvier and E. J. Crane, Serial No. 87,690, filed June 27, 1936. Briefly, the multiple engraving machine comprises four similar engraving heads 10, 11, 12 and 13, receiving motion from a line shaft 14 continuously rotated from a source of power (not shown) in the direction of the arrow 15. Each of the heads is similar in construction and operation and is operatively connected to the shaft 14 by a driving connection which includes a set of gears 18, whereby an article, such as a plastic molded telephone handset handle 19, which is to have a peripheral molding flash removed therefrom by cutting a continuous groove along the flash line, may be slowly revolved counterclockwise past an end milling cutter 20 which is continuously rotated at high speed by means of an air motor (not shown). Through suitable means included in the driving connections between the gears 18 and the engraving heads the starting and stopping of the heads is automatically effected so that upon a rotation of the handle 19 past the cutter 20 to cut a continuous groove therearound the head stops with the handle in the dotted outline position shown at head 10 and after a predetermined interval of time to permit the attendant to unload the grooved handle and to reload with another handle to be grooved the head starts its cycle again. The operating cycles of the heads are progressively out of phase with each other by equal degrees so that the grooving of handle 19 on head 11 is nearing completion when head 10 is being loaded and the handles on heads 12 and 13 are at this instant one-half and one-quarter grooved, respectively. A more detailed description and complete illustration of the driving connections from the line shaft 14 to the engraving heads, including the means for starting and stopping the heads have been omitted from the disclosure since they form no part of this invention and are not considered necessary to a complete understanding thereof.

In order that the machine as a whole may be operated at maximum efficiency and serviced by an attendant with a minimum of fatigue there is provided an automatic conveyer or chair 21 for conveying the attendant along from one head to the next so that the attendant will be positioned at each successive head at the ending and/or beginning of its operating cycle to unload and/or load the respective head. The chair is provided with rollers which ride on rails 22. Supported by and at either side of the chair 21 are trays 25, one for holding a supply of handles 19 to be grooved and the other for receiving the grooved handles after being removed from the engraving heads.

It is desirable in progressively moving the attendant from one head to the next that the chair 21 be started and stopped gradually, preferably with uniform acceleration and deceleration, thus preventing a jerky starting and stopping thereof with consequent discomfort to the attendant.

For causing the chair 21 to travel in the manner above described from head to head in timed relation with the condition of the work thereat there is provided a hydraulic drive with automatic speed and direction control. Attached, as indicated at 26, to opposite sides of the chair 21 below the rails 22 are the ends of a cable 27 which passes over a plurality of guide sheaves 28 and around a capstan 29 fixed to a shaft 32 carrying a pinion 33. The piston 33 meshes with a rack bar 34 fixed to one end of a ram or piston rod 35 carrying at its opposite end a piston 36 of a hydraulic cylinder 37. Oil is supplied to the cylinder 37 to cause reciprocation of the ram 35 at variable speeds by a variable displacement pump 39 of a commercial type, known as an "oil gear" and manufactured by The Oil Gear Company of Milwaukee, Wisconsin, and inasmuch as the specific construction of this pump forms no part of the present invention and is not considered necessary to a complete understanding thereof a detailed illustration and description thereof is deemed unnecessary. A continuously driven shaft for the pump 39 is indicated at 40 which may be connected to a suitable source of power (not shown).

The pump 39 is provided with two oil conduits 41 and 42 connected to opposite ends of the cylinder 37. An internal two position reverse flow valve, indicated in dotted outline at 43, of the pump 39 and controlled by an external mechanism to be presently described serves to direct the oil from the pump by means of the conduits 41 and 42 to opposite ends of the cylinder 37. It will be apparent that upon oil being entered into the left end of the cylinder 37, under suitable pressure, by means of the conduit 41, the piston 36 with the attached ram 35 will be moved to the right and similarly when oil is entered into the right end of the cylinder through the conduit 42, the ram will be moved to the left, the speed of the ram in either direction being governed by the rate of flow of the oil into the cylinder from the variable displacement pump 39 which is controlled by an external mechanism to be presently described. It will be apparent that the conduits 41 and 42 in addition to supplying oil alternately to opposite sides of the piston 36 also serve alternately as conduits for returning the oil from either side of the piston to the sump or reservoir of the pump 39.

For determining the action of the pump 39, that is, the direction and rate of flow of the oil therefrom and through the conduits 41 and 42 to the cylinder 37, there is provided a mechanism comprising a pair of rotary cams 47 and 48 fixed to a shaft 49 which is driven from and at the same speed as the continuously rotating line shaft 14 by means of similar cooperating gears 50 and 51 fixed to the shafts 49 and 14, respectively. The cam 47 has four suitably spaced and shaped lobes 54 to 57, inclusive, upon its cam surface for controlling the action of the pump 39 and thereby the rate of delivery of pressure oil into the cylinder 37 in timed relation with the starting and stopping of the heads 10 to 13, inclusive. One end of a horizontal lever 58 pivoted at 61 supports a roller which periodically engages the cam surface of the cam 47 during operation of the system, the other end of the lever being pivotally connected to one end of a vertical link 62 which is similarly connected at its opposite end to an arm 63 fixed to a control rod 64 of the pump 39 which has for its function to control the rate of delivery of the pump or to stop the delivery of fluid when the arm 63 is in its upper position. Extending loosely through an enlargement on the lever 58 between the pivot 61 and the link 62 is a vertically arranged shouldered rod 65 loosely guided adjacent its lower end in a fixed member 68. The lower end of the rod 65 supports a roller which constantly engages a cam plate 69 fixed to the reciprocatory ram 35. Surrounding the rod 65 and engaging at opposite ends a shoulder thereon and the lower surface of the enlargement on the lever 58 is a compression spring 70, which acts to rock the lever clockwise and move the roller end of the lever 58 into periodic engagement with the cam surface of the cam 47. A nut 71 threaded onto the upper end of the rod 65 serves as a stop for limiting the movement of the rod downwardly relative to the lever 58. In operation the nut 71 is engaged with the lever 58 except when the roller end thereof is rocked clockwise in riding over the cam lobes 54 and 57, inclusive. A tension spring 72 operatively attached to the roller end of the lever 58 and which is much weaker than the spring 70 cooperates with the latter in the movement of the lever 58 to control the feed rate of the pump 39 in a manner to be described hereinafter. The cam surface of the cam plate 69 is formed with three similar cams 74, 75 and 76, each including a receding and a rising cam surface 77 and 78, respectively.

Engaging the cam surface of the cam 48, which is formed with a single lobe 81, is a roller end of a lever 82 pivoted at 83, the opposite end of the lever being pivotally connected, as indicated at 84, to the outer end of a forked arm 85 fixed to an actuating rod 88 of the reverse flow valve 43. A tension spring 89 operatively attached to the lever 82 adjacent its connection with the arm 85 maintains the roller end of the lever 82 in constant engagement with the cam surface of the cam 48. The reverse flow valve 43 has two operative positions and in the position of the arm 85, as shown, the oil when the pump 39 is delivering pressure oil will be directed through the valve and the conduit 41 to the left side of the piston 36 and move it and the attached ram 35 towards the right. In the other position of the arm 85, indicated by a broken center line, the oil will be directed through the valve 43 and the conduit 42 to the right side of the piston and cause the ram to move towards the left. It will be apparent that the latter position of the arm 85 will be effected when the roller end of the lever 82 rides up the lobe 81 of the cam 48 in the continued rotation of the latter in the direction of the arrow and as the roller end of the arm rides down the cam lobe the full line position of the arm 85 will be effected.

In the operation of the herein described hydraulically actuated conveyer system and its automatic speed and direction control, as applied to a multiple unit engraving machine of the type above described, it is assumed that the operating cycles of the machine heads 10 to 13, inclusive, are such that they are progressively out of phase with each other by equal degrees, as is indicated by the different positions of the articles 19 mounted in their respective heads, and that the line shaft 14 is being constantly rotated at a predetermined speed and through the driving connections, fragmentarily indicated at 18, between the shaft and each of the heads the latter will be operated in the above described manner. It is also assumed that the rotary pump control cams 47 and 48 have been positioned relative to each other upon the shaft 49, which is being driven at the same speed as the line shaft 14 by means of the cooperating gears 50 and 51, and also to the pump control cam plate 69 so that the chair 21 will be moved progressively at desired speeds from the first head 10 to the last head 13 in one direction with a predetermined interval between movements and in timed relation with the starting and stopping of each head and then moved quickly back to head 10 to start the cycle again.

With the elements of the conveyer system and the hydraulic drive and its speed and direction control mechanism in the described positions, as shown in the drawing, the pump 39 which is constantly driven by the shaft 40 is merely idling, that is, no pressure oil is being delivered therefrom to the cylinder 37. The attendant has just removed a worked article 19 from the head 10, which has stopped and the attendant is in the act of reloading it with an article to be worked, to be positioned as shown in dotted outline at head 10, the heads 11, 12 and 13 being in operation and the work upon the articles associated therewith partially completed. During the servicing of the head 10 the roller end of the lever 58 is riding upon a concentric portion of the constantly rotating cam 47 between the lobes 57 and 54 thereof. Upon completion of the servicing operation the head 10 automatically starts to operate and substantially at this instant the cam lobe 54 engages the roller end of the lever 58 which rides up the lobe, thus rotating the lever counterclockwise about its pivot 61 and through the downward movement of the link 62 connected to its opposite end the arm 63 rotates the control rod 64 of the pump 39 in a clockwise direction. The movement imparted to the lever 58 by the cam lobes 54, 55 and 56 is only sufficient to cause the pump 39 to deliver pressure oil at a slow rate and oil is thus directed from the reverse flow valve 43 through the conduit 41 to the left side of the piston 36 of the cylinder 37, whereupon the ram 35 starts to move slowly towards the right. It is to be understood that the valve 43 was previously adjusted to the position shown to direct pressure oil to the left side of the piston 36 when the roller end of the lever 82 rode down the lobe 81 of the constantly rotating cam 48 and on to the concentric portion thereof.

In the continued movement of the ram 35 towards the right the roller end of the spring pressed vertical rod 65, due to the action of the spring 72, rides down the receding cam surface 77 of the cam 74 formed on the plate 69 fixed to the ram 35 and through its connection with the lever 58 by means of the stop nut 71 the lever 58 continues its counterclockwise rotation, which was started when it rode up the advancing cam lobe 54, and thus the feed rate of the pump 39 is gradually increased, its maximum delivery rate being effected when the actuating arm 63 reaches the position indicated by the broken center line, when the roller end of the rod 65 reaches the low point of the cam surface 77 at which point the rising cam surface 78 begins. In the meantime the cam lobe 54 has advanced past the roller end of the lever 58 which at this instant is spaced from the concentric portion of the cam 47 and lies between the cam lobes 54 and 55 so that the position of the arm 63 is solely under the control of the cam 74. The rate of delivery of the pump 39 is immediately gradually decreased by the roller end of the rod 65 riding up the still advancing cam surface 78 of the cam 74 and when it has reached the high point thereof, at which point the receding cam surface 77 of the cam 75 begins, the delivery of pressure oil from the pump 39 completely ceases as indicated in the drawing by the full line position of the actuating arm 63. During the gradual decrease in the delivery of oil from the pump 39 the roller end of the lever 58 has been moved into engagement with the concentric portion of the cam 47 at a point approximately midway between the lobes 54 and 55.

The rate of delivery of pressure oil from the pump 39, it will be apparent, controls the rate of flow of the pressure oil into the cylinder 37 and thereby the speed of the ram 35 and through the operative connections between the ram and the chair 21 carrying the attendant the movement of the chair is correspondingly effected. In the operation of the hydraulic drive and its speed control mechanism, to the point above described, wherein the rate of pressure oil delivery from the pump 39 has been gradually increased and then decreased, due to the cooperating cam 47 and cam plate 69, the chair 21 has been moved from the head 10 to the head 11 with uniform acceleration and deceleration in starting and stopping. Simultaneously with the stopping of the chair 21 at the head 11 the latter is automatically stopped, the work on the article 19 being completed.

At the termination of a predetermined period of time during which the stationary head 11 is unloaded and loaded again with an article 19, the head 11 starts operating and simultaneously therewith the advancing cam lobe 55 rocks the lever 58, thereby causing the pump 39 to deliver pressure oil to the cylinder 37, and the chair 21 is advanced to the head 12 in the manner previously described in connection with its advance from the head 10 to the head 11. After the unloading and reloading of the head 12 the chair 21 is advanced in like manner to the head 13 being started in its movement by the advancing cam lobe 56 rocking the lever 58. During the servicing period of the head 13 wherein the head and the chair are stationary the reverse flow valve 43 of the pump 39 is adjusted to the position indicated by a broken center line by the advancing cam lobe 81 of the cam 48 engaging the roller end of the lever 82 which rides up the lobe and rocks the valve actuating arm 85 to its reverse position. In this latter position of the arm 85 the pressure oil will be directed from the valve 43 and through the conduit 42 to the right side of the piston 36 when the pump 39 is delivering pressure oil to the cylinder 37. At the termination of the servicing period of the head 13 the head starts operating and simultaneously therewith the advancing cam lobe 57 engages the roller end of the lever 58 and the movement imparted thereto causes the pump 39 to deliver pressure oil to the cylinder 37 and the chair is returned to the head 10 to start again its progressive movement from head to head. The cam lobe 57 is of such formation that the rate of delivery of pressure oil from the pump 39 is such as to provide for an accelerated movement of the chair at starting, followed by a uniform rate of travel at a desired speed toward the head 10 and a decelerated movement in stopping thereat.

From the foregoing description it will be evident that an automatic conveyer system for an attendant servicing a plurality of machine units, the operating cycles of which are in predetermined phases, is provided which permits the several work units to be operated at maximum efficiency and with a minimum of fatigue and discomfort to the attendant.

Although the invention has herein been illustrated and described in connection with one embodiment thereof as applied to a particular type of multiple unit machine, it is to be understood that the novel features thereof are capable of various other applications limited only by the scope of the appended claims.

What is claimed is:

1. In a conveyer system for an attendant servicing a plurality of work stations of a material working machine, a carrier for an attendant, means for driving said carrier, and control means for said driving means effective to progressively move and automatically stop the carrier adjacent each work station.

2. In a conveyer system for an attendant servicing a plurality of work stations having their operating cycles in predetermined phases, a carrier for an attendant, and means operating in timed relation with the phases of the work stations for driving said carrier so that the carrier is stopped adjacent each work station for a definite period of time when said station is in a predetermined phase.

3. In a conveyer system for an attendant servicing a plurality of work stations, the operating cycles of which are in predetermined phases, a carrier for an attendant, means for driving said carrier, and control means for said driving means including a cam shaped to determine the movements of the carrier.

4. In a conveyer system for an attendant servicing a plurality of work stations, the operating cycles of which are in predetermined phases, a carrier for an attendant, means for driving said carrier, and control means for said driving means including a plurality of cooperating cams shaped to determine the movements and periods of stop of the carrier.

5. In a conveyer system for an attendant servicing a machine comprising a plurality of work stations, the operating cycles of which are in predetermined phases, a carrier for an attendant, and means for driving said carrier from one work station to another so that the carrier is stopped adjacent each station when said station is in a predetermined phase, said means including means for accelerating and decelerating the carrier between stops.

6. In a conveyer system for an attendant servicing a plurality of work stations, the operating cycles of which are in predetermined phases, a carrier for an attendant, means for driving said carrier, and control means for said driving means including a plurality of cooperating cams shaped to determine the movement, periods of stop of the carrier and for accelerating and decelerating the carrier between stops.

7. In a conveyer system for an attendant servicing a plurality of work stations, the operating cycles of which are in different phases, a carrier for an attendant, means including a hydraulic motor for driving said carrier, and means for supplying driving liquid to said motor so that the carrier is stopped adjacent each work station for a definite period of time when said station is in a predetermined phase.

8. In a conveyer system for an attendant servicing a plurality of work stations arranged in a single line, the operating cycles of which are in different phases, a reciprocatory carrier for an attendant, and means for moving said carrier in one direction from the first station to the last station of the single line of stations so that the carrier is adjacent each work station when said station is in a predetermined phase and then to effect a continuous movement in a reverse direction to repeat the cycle.

9. In a conveyer system for an attendant servicing a plurality of work stations, the operating cycles of which are in different phases, a reciprocatory carrier for an attendant, and means for moving said carrier in one direction so that the carrier is adjacent each work station when said station is in a predetermined phase and then to effect a continuous movement in a reverse direction to repeat the cycle, said means including means for accelerating and decelerating the carrier between work stations.

10. In a conveyer system for an attendant servicing a plurality of work stations, the operating cycles of which are in different phases, a carrier for an attendant, means including a hydraulic motor for driving said carrier, a variable displacement pump for operating said motor, said pump including means for controlling the displacement of driving liquid therefrom to said motor to regulate the rate of movement of said carrier, and means for operating said pump control means for effecting a progressive movement of said carrier so that the carrier is stopped adjacent each work station for a definite period of time when said station is in a predetermined phase.

11. In a conveyer system for an attendant servicing a plurality of work stations, the operating cycles of which are in different phases, a reciprocatory carrier for an attendant, means including a hydraulic motor for reciprocating said carrier, a variable displacement pump for operating said motor, said pump including means for controlling the displacement and direction of driving liquid therefrom to said motor to regulate the rate of and direction of movement of said carrier, and means for operating said pump control means through a predetermined cycle for effecting a progressive movement of said carrier from one work station to the next in timed relation with a predetermined phase thereof and a stoppage at each work station for a definite period of time and then to reverse its direction of movement to repeat the cycle.

12. In combination, a chair mounted for sidewise movement, power mechanism for moving said chair to a plurality of positions, and control means acting automatically to cause said chair to remain stationary a predetermined length of time at each of said positions in succession.

13. In a conveyer system for an attendant servicing a plurality of predeterminedly spaced work stations disposed in a horizontal plane of a material working machine having a working tool at each station, a chair mounted for sidewise horizontal movement for an attendant, means for guiding said chair along a predetermined path adjacent said stations, means including a continuously operating element for driving said chair, and control means for said driving means effective to progressively move and stop the chair at each station for a predetermined length of time.

GEORGE A. BOUVIER.
EINER W. LARSEN.